No. 794,302. PATENTED JULY 11, 1905.
S. J. HYMAN.
BOTTLE.
APPLICATION FILED DEC. 30, 1904.

WITNESSES:
Fred White
René Bruine

INVENTOR:
Samuel Jacob Hyman,
By Attorneys,
Arthur E. Fraser & Co.

No. 794,302. Patented July 11, 1905.

UNITED STATES PATENT OFFICE.

SAMUEL JACOB HYMAN, OF NEW YORK, N. Y.

BOTTLE.

SPECIFICATION forming part of Letters Patent No. 794,302, dated July 11, 1905.

Application filed December 30, 1904. Serial No. 238,945.

*To all whom it may concern:*

Be it known that I, SAMUEL JACOB HYMAN, a citizen of the United States, residing in the borough of Manhattan, city, county, and State of New York, have invented certain new and useful Improvements in Bottles, of which the following is a specification.

My invention aims to provide an improved bottle especially adapted for carrying dental floss and also tooth-powder or tooth-wash or similar material. The combination apparatus thus facilitates very much the keeping of one's teeth clean by providing at the same time the powder or the like which is used for brushing the teeth and the floss which is essential to cleaning between the teeth. The supply of dental floss is preferably carried around the outside of the neck of the bottle and may be most conveniently arranged on a sort of spool, described in detail hereinafter. The bottle or other vessel for carrying the powder may be of the usual or any suitable form. Being of standard make, it can be cheaply obtained, and any suitable arrangement for discharging small quantities of tooth-powder from the mouth of the bottle may be used without interference by the floss or the means for carrying the floss. Various other advantages are referred to in detail hereinafter.

The accompanying drawings illustrate certain apparatus embodying the invention.

Figure 1:
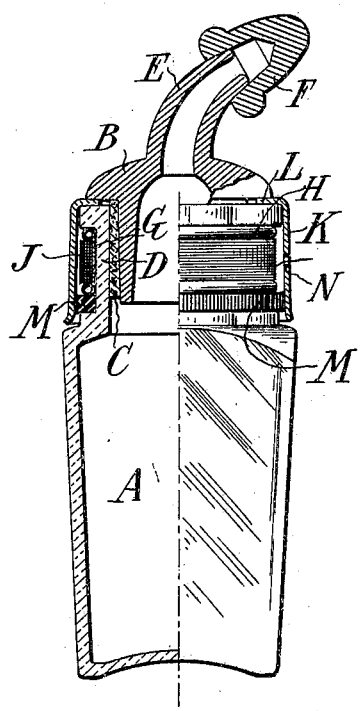
Figure 2:
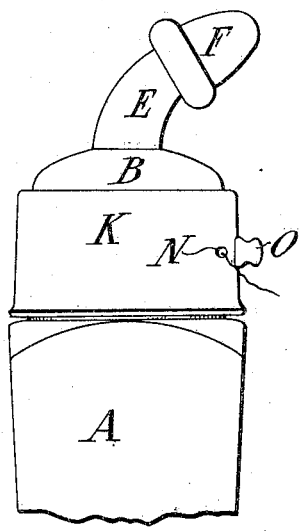
Figure 3:
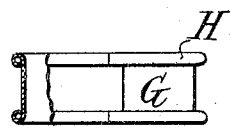

Figure 1 is a view, partly in elevation and partly in section, of the complete apparatus. Fig. 2 is an elevation of the upper part of the bottle. Fig. 3 is partly an elevation and partly a section of the spool or ring of metal which carries the floss.

The body A of the bottle may be of any suitable design, and it is to be understood that the bottle or analogous vessel, as well as the cap and various other parts hereinafter referred to, may be made of glass, rubber, metal, aluminium, or other suitable material. Preferably the bottle is of glass surmounted by a stopper B, of hard rubber, surrounded by a ring C, of cork, to make a tight fit in the neck D of the bottle. The stopper B is hollow and provided with a spout E, which is preferably bent in the manner shown and which is provided with a cap F on its end for closing it when not in use. When tooth-powder or other contents of the bottle are to be used, the cap F is removed and the contents shaken out through the stopper in desired small quantities.

For carrying the floss I preferably use a ring or spool G, of sheet metal or other hard substance, which fits loosely around the neck of the bottle and upon which the dental floss is wound, the ring G being preferably provided with raised edges H. The ring may be held in place on the neck by overlapping its ends and soldering them together in the manner indicated in Fig. 3, or the ends may be held together by merely winding the floss around the ring, or any other means may be utilized for this purpose. The floss is indicated at J and consists of a number of layers substantially sufficient to last about the same length of time as the internal contents of the bottle.

I prefer to provide a cover or cap K for the spool of floss, and this may consist, as shown, of a ring of sheet metal provided at its upper end with an inward flange L, which is engaged under the edge of the stopper B. Preferably also I utilize a rubber band M around the neck of the bottle below the spool G to prevent looseness of the latter and consequent rattling and turning at times when it is not intended to turn it. This ring M is preferably wide enough also to make a close fit with the lower edge of the cover K, thus holding this in place by friction and preventing rattling or any objectionable looseness. The thread may be drawn out through a hole N in the cover K and cut off in pieces of any desired length upon a cutter O. This cutter may be a piece of sharp metal soldered or otherwise attached on the outside of the cover K or punched up from said cover. The packing-ring M, of rubber, serves also to keep the floss perfectly clean by preventing the entry of dust or other foreign substances.

It will be seen that the complete apparatus provided by my invention is extremely useful. The provision for carrying the powder and the floss are so arranged as not to interfere with each other. The floss is kept perfectly clean and is easily drawn out and cut off of any desired length, leaving only a small end sufficient to take hold of the next time it is to be used. The entire apparatus can be very cheaply made—so cheap, in fact, as to justify throwing it away when the powder and floss are exhausted—or it may be made of more expensive materials and good finish, so as to permit of its being used over and over again. Numerous other advantages will readily suggest themselves to persons skilled in the art.

The word "bottle" is used here in a generic sense as applying to a can or box or any receptacle suitable for carrying a supply of tooth-powder or for carrying a liquid tooth-wash.

Though I have described with great particularity of detail certain embodiments of the invention, yet it is not to be understood that the invention is limited to the specific structure illustrated. Various modifications thereof in the material used and in the details and arrangement and combination of the parts may be made by those skilled in the art without departure from the invention.

What I claim is—

1. The combination with a bottle, of a spool carried around the neck of the bottle.

2. The combination with a bottle, of a spool G carried around the neck thereof for a supply of floss, a cover K surrounding said supply of floss, and a packing-ring M holding said cover tightly in position and preventing the entrance of dirt under the cover.

3. The combination with a bottle, of a stopper B having an orifice suitable for discharging small quantities of tooth-powder or the like, of a spool G around the neck of the bottle for a supply of floss, and a cover K for said supply of floss.

4. The combination with a bottle, of means attached thereto for carrying a supply of dental floss.

In witness whereof I have hereunto signed my name in the presence of two subscribing witnesses.

SAMUEL JACOB HYMAN.

Witnesses:
MAURICE MINTON,
E. C. SAMALS.